UNITED STATES PATENT OFFICE.

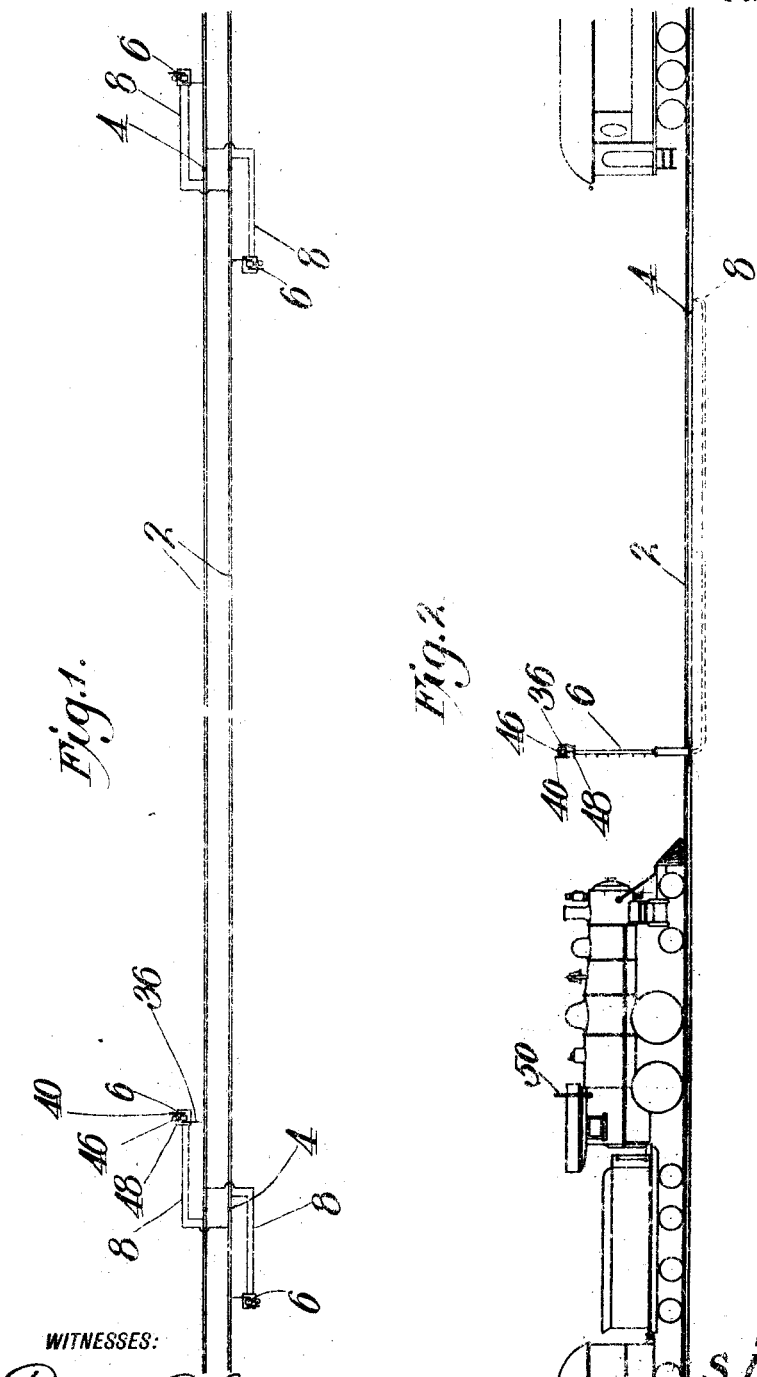

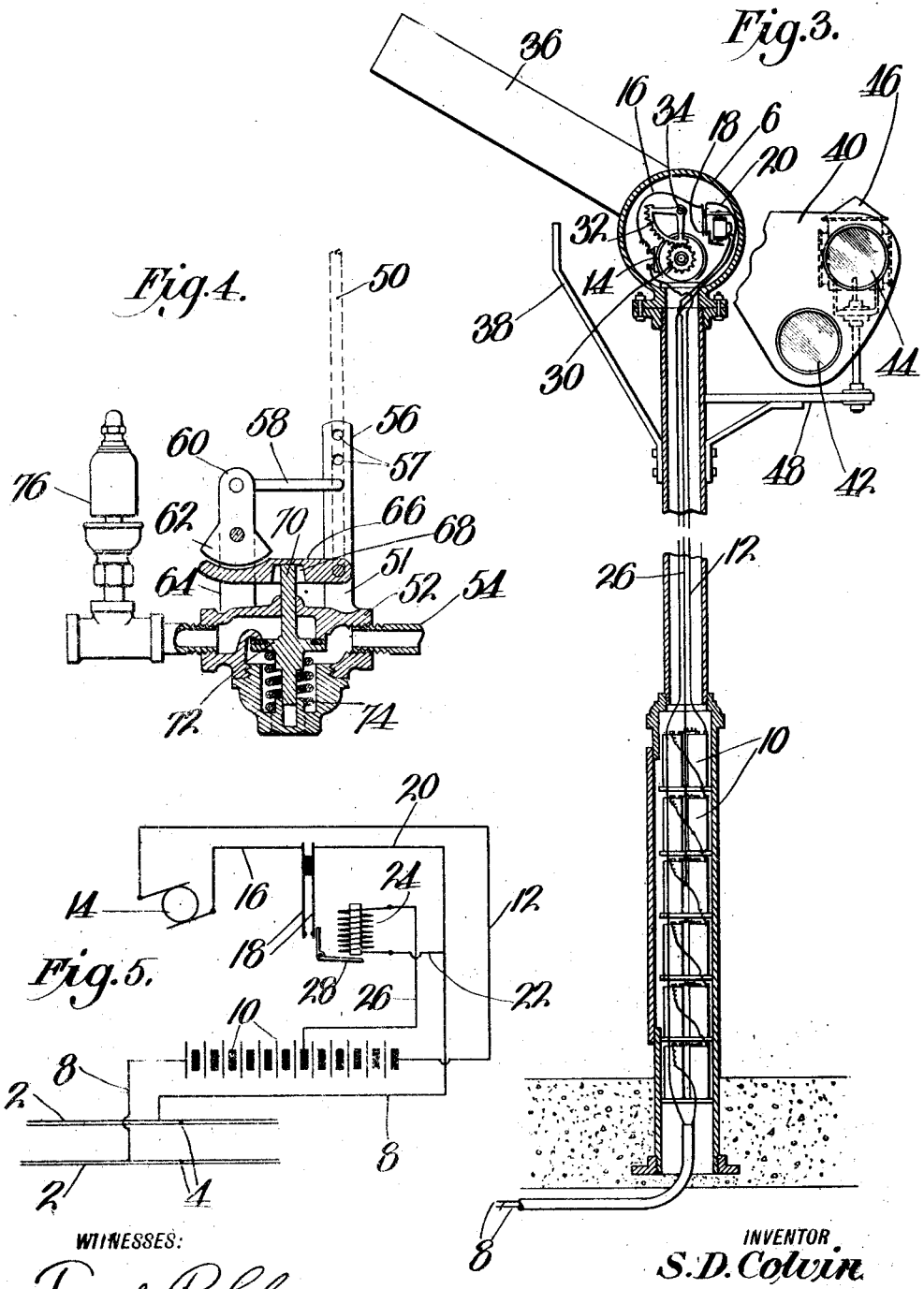
S. D. COLVIN.
AUTOMATIC SIGNALING AND TRAIN STOPPING DEVICE.
APPLICATION FILED DEC. 29, 1913.
1,186,750.
Patented June 13, 1916.
2 SHEETS—SHEET 2.

SHADY D. COLVIN, OF MYRTISTOWN, LOUISIANA.

AUTOMATIC SIGNALING AND TRAIN-STOPPING DEVICE.

1,186,750.    Specification of Letters Patent.    Patented June 13, 1916.

Application filed December 29, 1913. Serial No. 809,227.

*To all whom it may concern:*

Be it known that I, SHADY D. COLVIN, a citizen of the United States, residing at Myrtistown, in the parish of Caddo and State of Louisiana, have invented certain new and useful Improvements in Automatic Signaling and Train-Stopping Devices, of which the following is a specification.

This invention relates to automatic train stopping devices for use in connection with the block system of railway signaling, and the principal end in view is to provide an effective apparatus for automatically stopping a train which is allowed, through inattention of the engineman, to pass a signal at the entrance of a block already occupied by another train.

With this general object in view, the invention consists in certain novel and peculiar features of construction and organization as hereinafter described and claimed, and in order that it may be fully understood reference is to be had to the accompanying drawings in which—

Figure 1, is a plan view showing an outline of a block with signals protecting it and the adjacent blocks. Fig. 2, is a side view representing the adjoining portions of two occupied blocks. Fig. 3, is a broken vertical section through one of the semaphores. Fig. 4, is a vertical section through the train brake valve with its operating mechanism. Fig. 5, is a diagram of the electric control circuit.

Referring to the drawings, each block comprises a section of track 2 of a given length, for example five miles, adjoining sections being provided with insulated joints 4. The end of each block is guarded by a semaphore 6, which is located alongside the adjoining block and at a distance of some fifty feet from the insulated joint 4.

Primary circuit wires 8 lead from the end rails of each block to the corresponding semaphore where one of the wires connects with one of the poles of an electric battery, the cells 10 of which are arranged in series within the tower of the semaphore. The other pole of the battery is connected by the conductor 12 of a secondary circuit with one of the poles of a motor 14. The opposite pole of the motor is connected by a conductor 16 with one of a pair of resilient contact members 18 which are insulated and normally spread out of contact, as illustrated in Figs. 3 and 5. The other of said contact members is connected by a conductor 20 with the other primary circuit wire 8. The latter circuit wire is also connected with the conductor 22 leading to a relay coil 24 forming a part of the primary circuit running back through the conductor 26 to one of the battery cells. As many of such cells are included in the primary circuit as are necessary for the operation of the circuit closing lever 28 to cause the same to close the secondary circuit through the contacts 18 and thereby operate the motor. It will be understood that the poles of the batteries of the semaphores at opposite ends of each block are reversely arranged to prevent any current flowing except by way of the car wheels.

The motor 14 is provided with a pinion 30 in engagement with a gear segment 32 on a shaft 34 which carries the signal arm 36. When the arm 36 is moved into operative or horizontal position, this movement is limited by an arm 38, projecting upward from the tower into the path of said signal arm. The arm 36 is held normally raised into inoperative position by the heavier metallic signal arm 40, also mounted on the shaft 34 and carrying the colored windows 42 and 44 which are positioned alternately opposite the lantern 46 carried by the shelf 48 of the tower.

When the signal arm 36 of any one of the semaphores is in horizontal or operative position, it is adapted to come into engagement with a valve lever 50 provided on the engine for the purpose of applying the emergency brake in case a train should attempt to enter a block which is protected by such signal. This lever projects above the engine cab, (see Fig. 2) and is pivotally mounted in and at one side of lugs 51 provided on a valve casing 52 (see Fig. 4) which is in communication with the main air line 54 of the brakes. Fixedly connected with the pivot of the lever 50 at the opposite side of the said lugs from the said lever is an arm 56 provided with a series of perforations 57 for receiving one end of a link 58. The other end of the link 58 is pivoted to the arm 60 carried by the segment 62, which is pivoted eccentrically between the lugs 64 on the valve casing. This mounting of the segment 62 permits its operation in either direction to actuate a lever 66 pivoted on the fulcrum of the lever 50 between the lugs 51 and having a socket 68 fitting the outer end of the stem 70 of the valve 72 in the casing 52. Thus by the backward throw of the arm 50 by engagement with the signal arm 36, the segment 62 is actuated in a forward direction to open the valve against the action of its spring 74, and since actuation of the segment in the opposite direction will also open the valve, it is obviously impracticable for any one very readily to adjust the valve operating mechanism so as to render it inoperative. By engaging the link 58, with different perforations of the arm 56, the lever 50,—which is parallel and rigid with arm 56, as both have a common pivot—will stand vertical, as shown, or inclined rearwardly. If the size of the locomotive is such that the lever 50 if vertical would project too high and hence be swung an excessive distance by the semaphore upon striking same, the operator will adjust the link on arm 56, to incline the lever rearwardly so that it cannot strike the semaphore too soon and hence be swung too far before passing clear of the semaphore.

A whistle 76 is located in connection with the pipe 54 adjacent the valve casing so that the opening of the valve will be accompanied by a blast of the whistle to warn the engineman of the cause which has resulted in the application of the brakes, the pitch of said whistle being of a character readily distinguishable from the usual engine whistle, if desired.

From the foregoing description taken in connection with the drawings it will be understood that as a train passes from one block to another it closes the primary electric circuit, as above indicated through both semaphores of a block entered, and thereby actuates the relays to close the secondary or motor circuits. The full battery current is then switched through each motor which operates to bring the signal arms into horizontal or operative position and hold them in such position so long as the train occupies the block. If now through inattention or carelessness on the part of the engineman, a train in an adjoining block should attempt to pass one of the signal arms, and the engine is properly provided with an emergency brake valve 72 this valve will be operated through the engagement of its arm 56 with the signal arm, to immediately apply the train brakes, and bring the train to a standstill and the sounding of the whistle 76 will apprise the engineman of the exact cause of the application of the brakes.

From the above description it will be apparent that I have produced an automatic train signaling and stopping device embodying the features of advantage enumerated as desirable, and I wish it to be understood that while I have illustrated and described the preferred embodiment of the same, I do not desire to be restricted to the exact construction and organization shown, and described, but reserve the right to make all changes falling within the scope of the appended claim.

I claim:

In a train-stopping system, the combination with a semaphore, of an air pipe on a train, a valve normally closing said pipe, a lever mounted on the valve casing and adapted for operation by striking the semaphore when the same is in signaling position, an eccentrically pivoted segment, connections between the same and the lever whereby movement of the latter shall be transmitted to said segment, and a lever to be operated by the segment when the latter is moved, to open the said valve.

In testimony whereof, I affix my signature, in the presence of two witnesses.

SHADY D. COLVIN.

Witnesses:
S. H. CHATTEN,
W. H. WELCH.